US011169750B2

(12) United States Patent
Takenaka et al.

(10) Patent No.: US 11,169,750 B2
(45) Date of Patent: Nov. 9, 2021

(54) PRINTING APPARATUS, PRINTING CONTROL METHOD, AND STORAGE MEDIUM

(71) Applicant: CANON KABUSHIKI KAISHA, Tokyo (JP)

(72) Inventors: Shuichi Takenaka, Kashiwa (JP); Kiichi Hasegawa, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/870,089

(22) Filed: May 8, 2020

(65) Prior Publication Data

US 2020/0364005 A1   Nov. 19, 2020

(30) Foreign Application Priority Data

May 14, 2019 (JP) .............................. JP2019-091658

(51) Int. Cl.
*G06F 3/12* (2006.01)

(52) U.S. Cl.
CPC .......... *G06F 3/1205* (2013.01); *G06F 3/1255* (2013.01); *G06F 3/1257* (2013.01); *G06F 3/1285* (2013.01)

(58) Field of Classification Search
CPC .... G06F 3/1205; G06F 3/1285; G06F 3/1257; G06F 3/1255
See application file for complete search history.

(56) References Cited

U.S. PATENT DOCUMENTS

| 2008/0079974 A1* | 4/2008 | Ferlitsch | G06F 3/1204 358/1.13 |
| 2009/0059940 A1* | 3/2009 | Sultan | H04L 29/12009 370/401 |
| 2016/0323477 A1* | 11/2016 | Sumita | H04N 1/0097 |
| 2018/0267750 A1* | 9/2018 | Kobayashi | G06F 3/1258 |
| 2019/0129669 A1* | 5/2019 | Takahashi | H04N 1/00477 |
| 2019/0227758 A1* | 7/2019 | Suzuki | H04L 69/16 |

FOREIGN PATENT DOCUMENTS

JP    2013-196263 A    9/2013

OTHER PUBLICATIONS

Hatano Shinko; JP-2013196263-A; Sep. 2013, cited paragraphs of the English translation. (Year: 2013).*

* cited by examiner

*Primary Examiner* — Neil R McLean
(74) *Attorney, Agent, or Firm* — Canon U.S.A., Inc. IP Division

(57) ABSTRACT

In order to enable print setting that depends on functional characteristics of a printing apparatus also in printing processing that depends on an instruction from a client device that has not installed a printer driver of the printing apparatus, an information processing device includes setting management unit configured to transmit information on a print settings screen of the printing apparatus and display the print settings screen on a display of the information processing device, a reception unit configured to receive information on print settings of the printing apparatus, which is input on the print settings screen, from the information processing device, a storage unit configured to store the print settings into a memory unit in association with the information processing device, and a printing control unit configured to execute printing processing based on the print settings when print data is received from the information processing device.

16 Claims, 14 Drawing Sheets

PRINTING APPARATUS, PRINTING CONTROL METHOD, AND STORAGE MEDIUM

BACKGROUND

Field of the Disclosure

The present disclosure relates to a printing apparatus, a printing control method, and a storage medium storing a program for operating the printing apparatus.

Description of the Related Art

In recent years, a printing apparatus has been provided with various kinds of functions, thereby being capable of generating a wide variety of deliverables by using those functions in combination. When printing processing is executed at the time of image formation, a printer driver of a relevant printing apparatus is usually used to transmit print data. The printer driver assigns, to a document to be printed, print settings for various kinds of functions that can be processed by the printing apparatus as print settings information, and generates print data to transmit the print data to the printing apparatus. The printing apparatus reads the print settings information assigned to the received print data to enable the corresponding function, and executes printing processing, to thereby generate a deliverable. In Japanese Patent Application Laid-Open No. 2013-196263, there is disclosed a technology of executing, by a printing apparatus, printing processing by associating pieces of print settings information with data, which are separately transmitted from terminal devices.

In recent years, the function of a mobile device has been advanced, which enables a high-performance mobile terminal, for example, a smartphone, to cause printing. When such a high-performance mobile terminal causes printing processing, a printer driver cannot usually be used, and a standard printing function provided by an operating system (OS) is used to generate print data, and the generated data is transmitted to the printing apparatus. In this case, in the print settings, only the standard items such as the number of copies, color/monochrome printing, duplex printing, page range, and sheet size can be set, however, the advanced setting that utilizes the functional characteristics of the printing apparatus cannot be performed in many cases.

SUMMARY

Embodiments of the present disclosure have been made in view of the above-mentioned issue, and enable execution of print setting depending on functional characteristics of a printing apparatus also in printing processing that is caused in response to an instruction from a client device that has not installed a printer driver of the printing apparatus.

Embodiments of the present disclosure provide a printing apparatus including: a setting management unit configured to transmit, to an information processing device, information on a print settings screen of the printing apparatus, and to cause a display of the information processing device to display the print settings screen a reception unit configured to receive information on print settings of the printing apparatus, which is input on the print settings screen, from the information processing device; a storage unit configured to store the print settings into a memory unit in association with the information processing device; and a printing control unit configured to execute printing processing based on the print settings when print data is received from the information processing device.

According to the present disclosure, execution of the print setting depending on functional characteristics of the printing apparatus is enabled also in the printing processing that is caused in response to the instruction from the client device that has not installed the printer driver of the printing apparatus.

Further features of the present disclosure will become apparent from the following description of exemplary embodiments with reference to the attached drawings.

DESCRIPTION OF THE EMBODIMENTS

Figure 1:
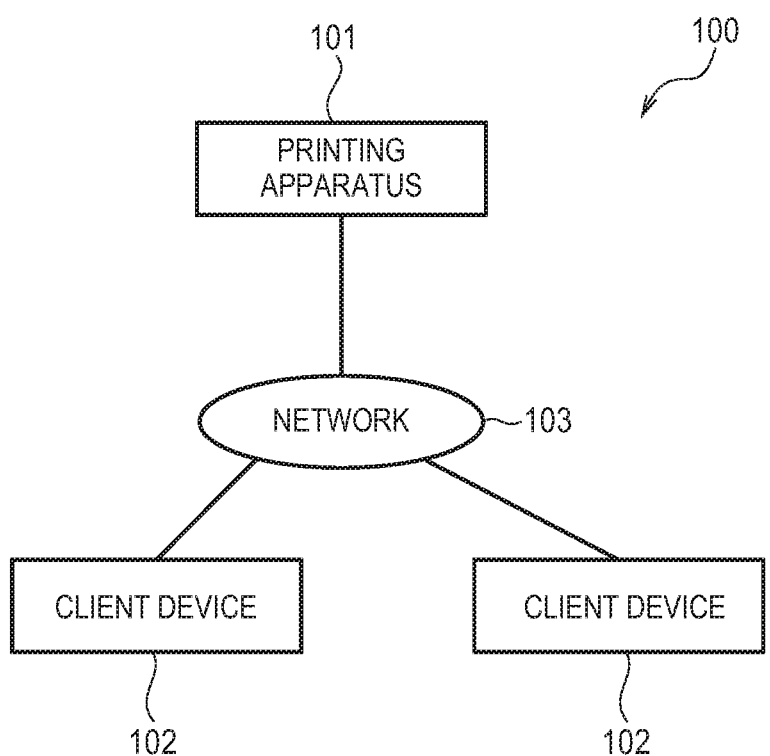
FIG. 1 is an overall configuration diagram of a printing system.

In the following, embodiments of the present disclosure are described with reference to the drawings.

First Embodiment

First, description is made of an outline of a printing apparatus according to a first embodiment of the present disclosure. The printing apparatus according to the first embodiment is configured to manage a print settings screen that can be accessed via a web browser or a web view of a client device such as a personal computer or a mobile terminal. Various kinds of settings, information/state, and consumable information of the printing apparatus can be displayed on the print settings screen. A user can specify print settings on the print settings screen through the client device before input of print data, and the printing apparatus can receive and store the print settings before reception of the print data.

A program that uses the technology of JavaScript is embedded in the print settings screen. The printing apparatus can use this program to acquire apparatus information such as an IP address (global IP address), OS information, position information, and used web browser information of the accessed client device. Further, the printing apparatus acquires a local IP address or positional information of the client device when security setting of the client device is allowed. When the client device has finished print setting on the print settings screen, the printing apparatus stores device information and print settings information in the print settings as setting-time device information in association with each other. The print settings screen can also require login authentication at the time of access in cooperation with a user authentication function. In this case, the information processing apparatus also acquires a user ID and a password at the time of login authentication, and stores the user ID and the password in the setting-time device information.

The printing apparatus controls resetting of the print settings on the print settings screen so as not to be executed before the printing apparatus receives print data unless a predetermined period of time has elapsed or the user selects a reset button described later. When the printing apparatus has received print data, the printing apparatus executes printing processing, deletes the setting-time device information, and gets ready to receive print settings on the print settings screen again. This is to prevent application of unexpected different print settings because print setting for next printing processing is performed on the print settings screen before the printing apparatus receives print data and reflects the print settings in the printing processing, and the print settings and the target print data do not match each other. When the print setting is finished on the print settings screen, the printing apparatus performs such screen control as to prohibit print setting for the next print data basically until the target print data is received, to thereby synchronize the print settings with the print data.

After the print setting is performed on a preliminary print settings screen, print data including print settings set by a standard printing function is input from the client device. At the same time, when the printing apparatus receives the print data, the printing apparatus acquires device information that can be acquired via a communication protocol. In general, a TCP/IP communication protocol such as HTTP or IPP is used at the time of reception of print data. Thus, the printing apparatus according to the first embodiment stores the device information that can be acquired via such a communication protocol as printing-time device information in association with the print data. When the printing apparatus executes printing processing, the printing apparatus derives print settings information associated with the setting-time device information from the printing-time device information, and applies the print settings information to the associated print data, to thereby execute the printing processing. With this, even when the standard printing function provided by the OS is used, printing processing in which advanced setting that utilizes the functional characteristics of the printing apparatus can be used is achieved.

An image forming system according to the first embodiment uses the technology of JavaScript, which executes a program embedded in a web page on a web browser. However, the image forming system is not limited thereto. As another example, the image forming system may use the function of a web view instead of a web browser. Further, as another example, the image forming system may use the technology of Web Real-Time Communication (WebRTC) instead of JavaScript.

FIG. 1 is an overall configuration diagram of a printing system 100 according to the first embodiment of the present disclosure. A printing apparatus 101 is connected to a plurality of client devices 102 via a network 103. The printing apparatus 101 is a multifunctional peripheral having various kinds of functions such as scanning, facsimile, printing, and copying, or a printer having only a printing function. The client device 102 is a personal computer, mobile phone, or PDA held by the user, or a mobile terminal device such as a multi-functional mobile phone (hereinafter referred to as "smartphone") or a tablet, which has been rapidly widespread in recent years. The client device 102 is an example of the information processing apparatus. The client device 102 transmits print data to the printing apparatus 101 via the network 103. The network 103 is a wireless or wired network formed of a WAN or LAN.

Figure 2:
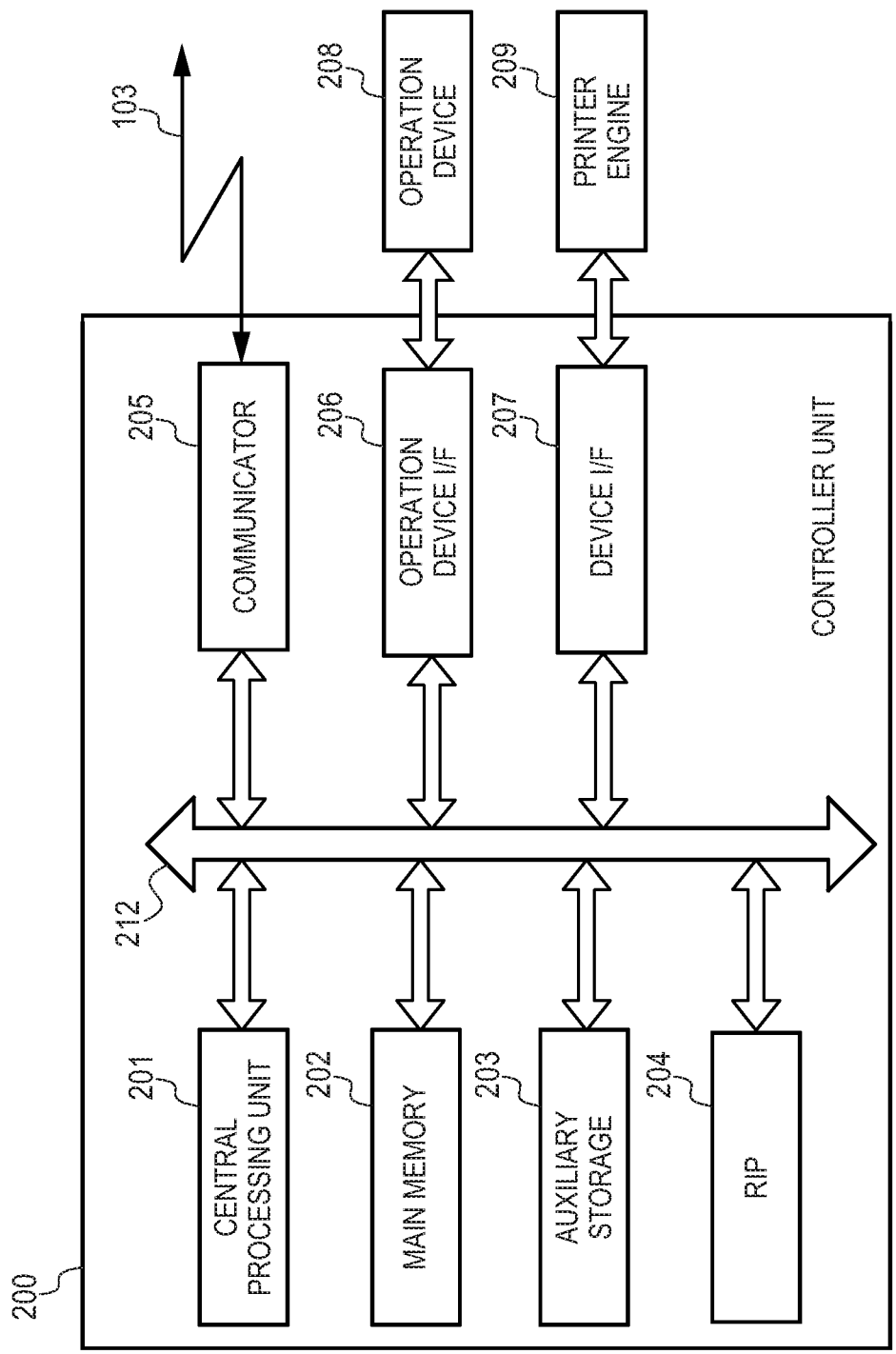
FIG. 2 is a hardware configuration diagram of a printing apparatus.

FIG. 2 is a hardware configuration diagram of the printing apparatus 101. The printing apparatus 101 includes a controller unit 200, an operation device 208, and a printer engine 209. The controller unit 200 is configured to control input/output of an image signal or device information. The controller unit 200 includes a central processing unit 201, a main memory 202, an auxiliary storage 203, a RIP 204, a communicator 205, an operation device IF 206, and a device I/F 207. Those components of the controller unit 200 are connected to one another via a system bus 212.

The central processing unit 201 is configured to read a program stored in the auxiliary storage 203 into the main memory 202, and execute the program. Further, the central processing unit 201 is configured to control each device connected to the system bus 212 in an integrated manner. The main memory 202 functions as a main memory or a working memory of the central processing unit 201. The auxiliary storage 203 stores a large volume of data temporarily or for a long period of time. The function and processing of the printing apparatus 101 described later are implemented by the central processing unit 201 reading a program stored in the auxiliary storage 203, and executing the program.

The RIP 204 is a dedicated hardware configured to convert intermediate print data into a raster image. The RIP 204 is configured to process intermediate print data generated in the main memory 202 by the central processing unit 201 at high speed in parallel to execution by the central processing unit 201. The communicator 205 is connected to the network 103, and is configured to receive input of print data or device information from an external apparatus, or output the print data or device information to the external apparatus.

The operation device I/F 206 is an interface for the operation device 208, and is configured to output image data to be displayed on the operation device 208 to the operation device 208. Further, the operation device I/F 206 is configured to transfer information input by the user in the operation device 208 to the central processing unit 201. The device I/F 207 is configured to transmit an image signal, or receive a device operation instruction or device information based on an instruction given by the central processing unit 201. The controller unit 200 is connected to the printer engine 209 via the device I/F 207. The operation device 208 includes a liquid crystal panel and a sound source as an output device, and includes a touch panel, a hard key, and a microphone as an input device. The printer engine 209 is an output device configured to output an image signal from the controller unit 200 to a medium, and may employ an electrophotographic method or an ink-jet method.

Figure 3:
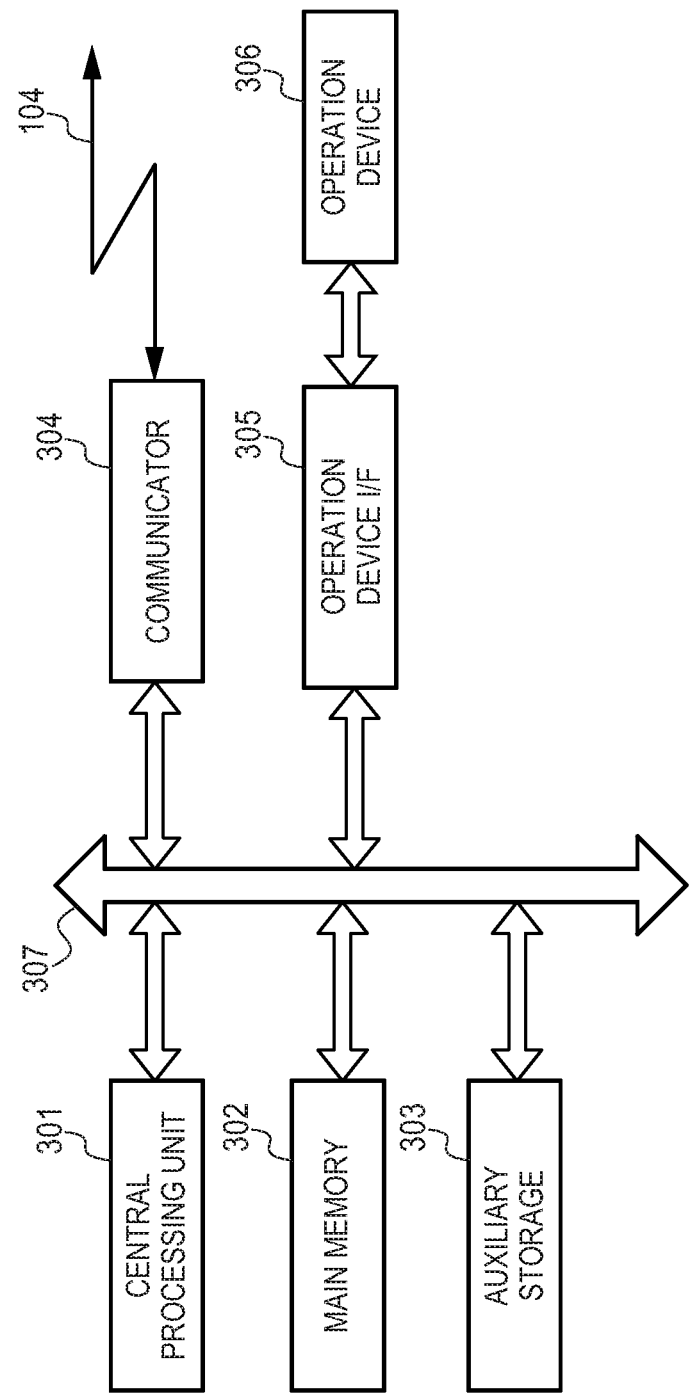
FIG. 3 is a hardware configuration diagram of a client device.

FIG. 3 is a hardware configuration diagram of the client device 102. The client device 102 includes a central processing unit 301, a main memory 302, an auxiliary storage 303, a communicator 304, an operation device I/F 305, and an operation device 306. The central processing unit 301, the main memory 302, the auxiliary storage 303, the communicator 304, and the operation device I/F 305 are connected to one another via a system bus 307.

The central processing unit 301 is configured to read a program stored in the auxiliary storage 303 into the main memory 302, and execute the program. Further, the central processing unit 301 is configured to control each device connected to the system bus 307 in an integrated manner. The main memory 302 functions as a main memory or a working memory of the central processing unit 301. The auxiliary storage 303 stores an operating system (OS) and various kinds of control programs. The auxiliary storage 303 stores a large volume of data temporarily or for a long period of time. The print data to be transmitted to the printing apparatus 101 is stored in the region of the auxiliary storage 303. The function and processing of the client device 102 described later are implemented by the central processing unit 301 reading a program stored in the auxiliary storage 303, and executing the program.

The communicator 304 is connected to the network 104, and is further connected to an external device, for example, the client device 102, via a wired or wireless network. The communicator 304 is responsible for input/output of communication data. The client device 102 receives a print settings screen from the printing apparatus 101 via the communicator 304, and transmits print data to the printing apparatus 101.

The operation device I/F 305 is an interface for the operation device 306, and is configured to output image data to be displayed on the operation device 306 to the operation device 306. Further, the operation device 306 transfers information input by the user to the central processing unit 301. The operation device 306 includes a liquid crystal panel and a sound source as an output device, and includes a touch panel, a hard key, and a microphone as an input device. The operation device 306 is configured to acquire information, for example, a print settings screen, from the printing apparatus 101 via the communicator 304, and display the print settings screen on a web browser or a web view. The user can operate the screen displayed on the operation device 306 to perform print setting.

A disc drive for a portable disc storage medium, such as a CD or a DVD, or a memory reader/writer or the like for a portable non-volatile storage medium, such as a flash memory or a microSD, may be connected to the system bus 307. For example, the print data may be stored in the auxiliary storage 303 via a portable storage medium.

Figure 4:
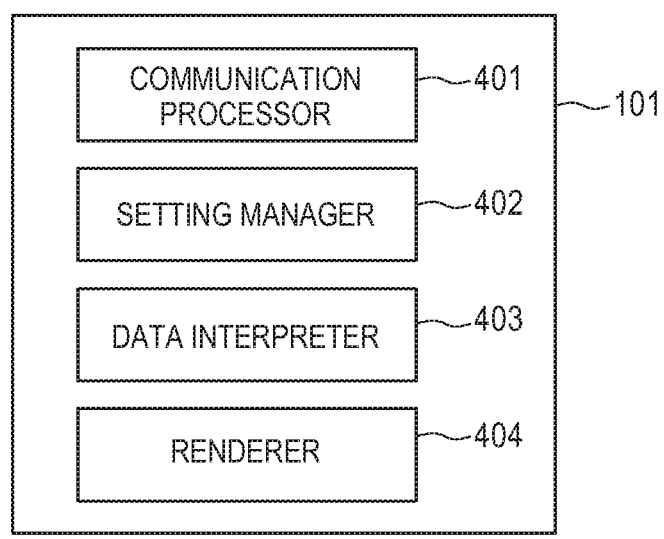
FIG. 4 is a functional configuration diagram of the printing apparatus.

FIG. 4 is a functional configuration diagram of the printing apparatus 101. The printing apparatus 101 includes a communication processor 401, a setting manager 402, a data interpreter 403, and a renderer 404. The communication processor 401 is configured to control communication to/from an external device. The communication processor 401 is configured to receive print data, for example. The setting manager 402 is configured to manage information on print settings (hereinafter referred to as "print settings information"). The data interpreter 403 is configured to interpret drawing information in the print data received by the communication processor 401. The drawing information extracted as a result of this data interpretation processing is transmitted to the renderer 404, and is used for rendering processing. The renderer 404 generates a bitmap image by using the RIP 204 based on the drawing information transmitted from the data interpreter 403. The generated bitmap image is transmitted to the printer engine 209 via the device I/F 207. The printer engine 209 executes image forming processing for a printing sheet based on the bitmap image. That is, the printer engine 209 executes printing control processing.

Figure 5:
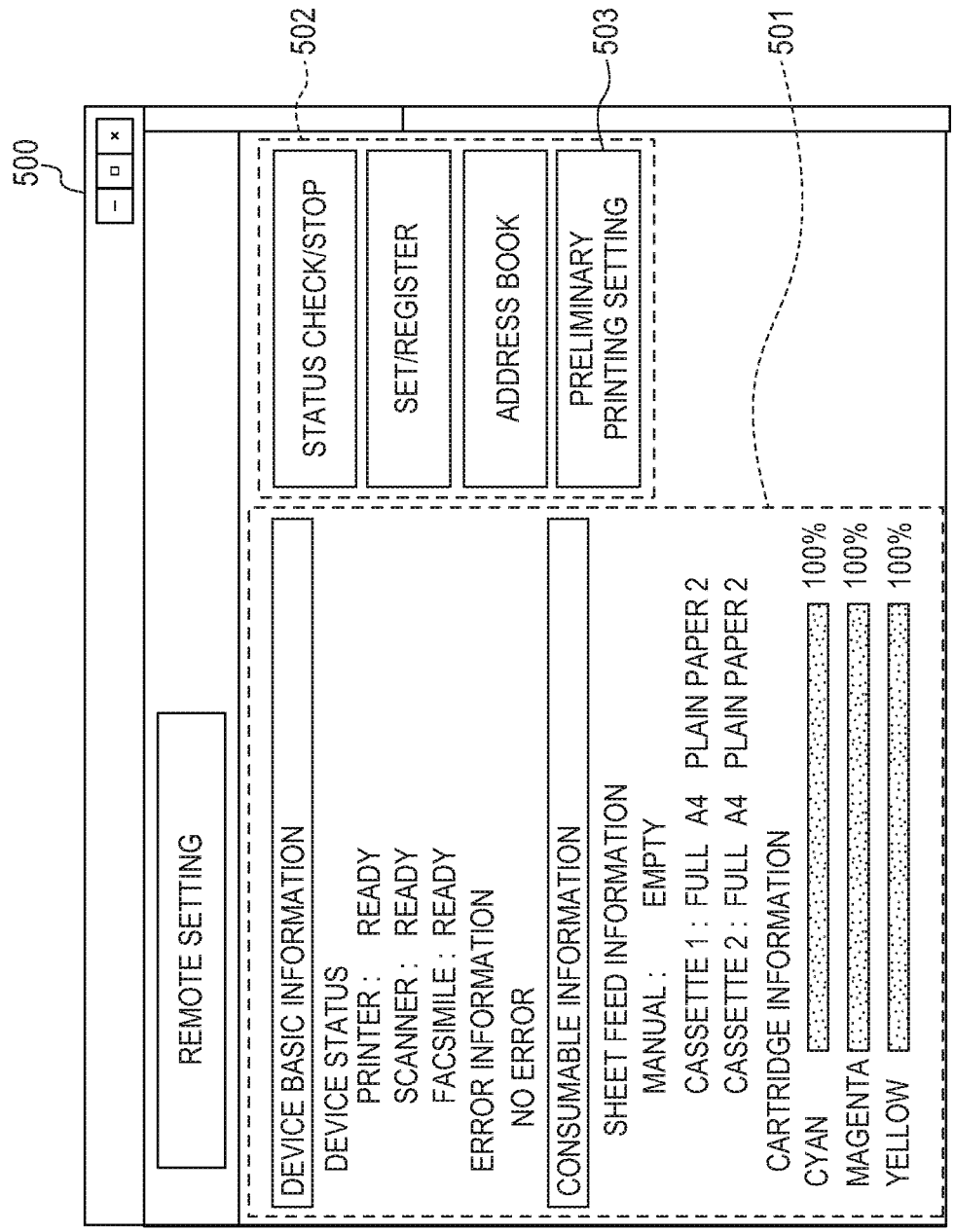
FIG. 5 is a diagram for illustrating an example of a UI screen.
Figure 6A:
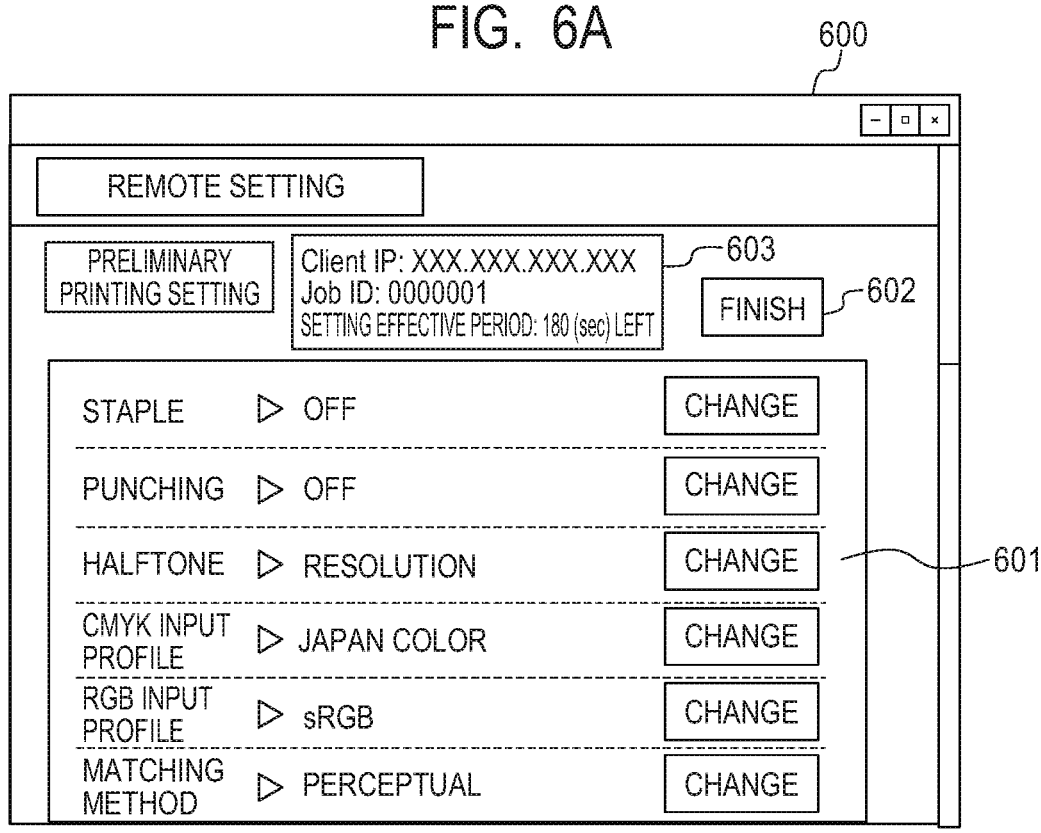
FIG. 6A and FIG. 6B are diagrams for illustrating examples of the UI screen.
Figure 6B:
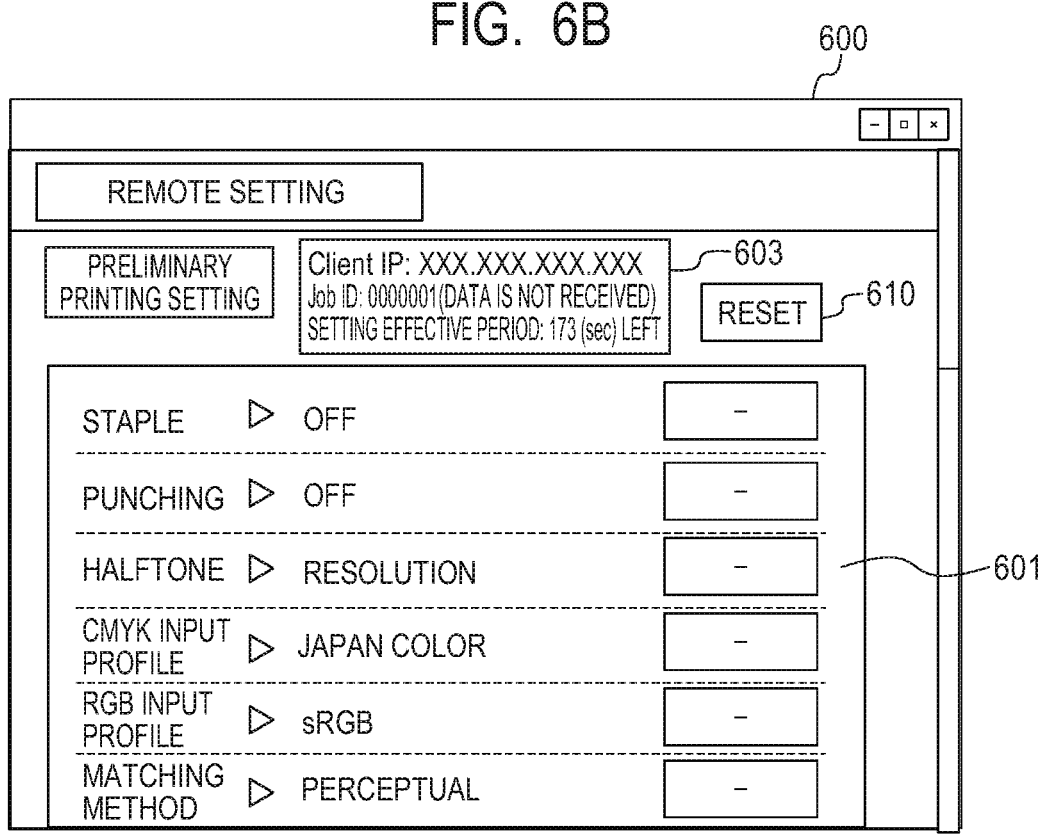

FIG. 5, FIG. 6A and FIG. 6B are diagrams for illustrating an example of a UI screen to be displayed on a liquid crystal panel serving as a display of the client device 102. The UI screen illustrated in FIG. 5, FIG. 6A and FIG. 6B is displayed by using a web browser or a web view of the client device 102. It is possible to access the setting screen of the printing apparatus 101 through the client device 102 at a remote location by specifying an IP address as a URL in a web browser or a web view of the client device without the user moving to the printing apparatus 101. There is also a case in which user authentication is required to display the UI screen depending on the security settings of the printing apparatus 101.

FIG. 5 is diagram for illustrating an example of display of a first settings screen 500 for performing an operation of setting the printing apparatus 101 at a remote location. In a status display region 501 of the first settings screen 500, statuses of the printer, scanner, and facsimile machine and error information are displayed as the device basic information, and further, information on a sheet set in a paper drawer and cartridge information are displayed as consumable information. Further, in a settings region 502, buttons for checking status of a printing job, giving an instruction to stop the job, changing various kinds of settings, editing an address book, and transitioning to a preliminary print settings screen described later are displayed.

When the preliminary print settings button 503 is selected, a second settings screen 600 illustrated in FIG. 6A is displayed. On the second settings screen 600, an advanced settings region 601 enabling advanced setting that utilizes the functional characteristics of the printing apparatus 101 is displayed. Items that can be set on the advanced settings region 601 are items equivalent to items that can be set by installing a printer driver of the printing apparatus 101.

On the second settings screen 600 illustrated in FIG. 6A, a device information region 603 that displays device information on the client device 102 is displayed additionally. As described above, the device information is acquired and displayed on a web browser or a web view by using the technology of JavaScript or WebRTC embedded in the second settings screen 600. The device information region 603 further displays an effective period in which a relevant job TD and print settings are applied. The job ID is an ID of a job to which the print settings set on the second settings screen 600 are applied, and the value of the job ID is increased after the job ID is applied to printing processing. The effective period indicates a period in which application of the print settings set in the second settings screen 600 is effective.

After the user has edited (set) various kinds of print settings on the advanced settings region 601, the user selects a finish button 602 to establish the print settings. FIG. 6B is a diagram for illustrating an example of display on the second settings screen 600 after the finish button 602 is selected, the print settings are established, and the printing apparatus 101 has received the print settings information. After the print settings are established, the print settings are locked to prohibit a change operation on the advanced settings region 601. However, when a reset button 610 is selected, this locking is released, and as illustrated in FIG. 6A, a change operation on the advanced settings region 601 is allowed again.

After the print settings are established, as illustrated in FIG. 6B, the printing apparatus 101 adds, to the device information region 603, a job ID and information to the effect that the printing apparatus 101 has not received the print data, and displays the device information region 603. Further, an effective period to which preliminary print settings are applied starts to be counted down when the print settings are established. Then, the printing apparatus 101 returns the screen display to the state of FIG. 6A when the remaining period becomes 0. That is, the printing apparatus 101 returns the screen display to a state in which advanced print settings can be received.

The printing apparatus 101 receives the print settings information in accordance with selection of the finish button 602 illustrated in FIG. 6A, and at the same time, acquires the device information acquired on the web browser or web view of the client device 102. That is, the printing apparatus 101 acquires the setting-time device information. After the finish button 602 has been selected, the printing apparatus 101 performs such control as to prohibit a change operation on the advanced settings region 601 until print data is received. In the first embodiment, as illustrated in FIG. 6B, the printing apparatus 101 disables a change operation on the advanced settings region 601. When a predetermined period of time has elapsed since selection of the finish button 602, and when the reset button 610 is selected, as illustrated in FIG. 6A, the printing apparatus 101 controls screen display so as to allow a change operation on the advanced settings region 601 with the job ID as it is.

Figure 7:
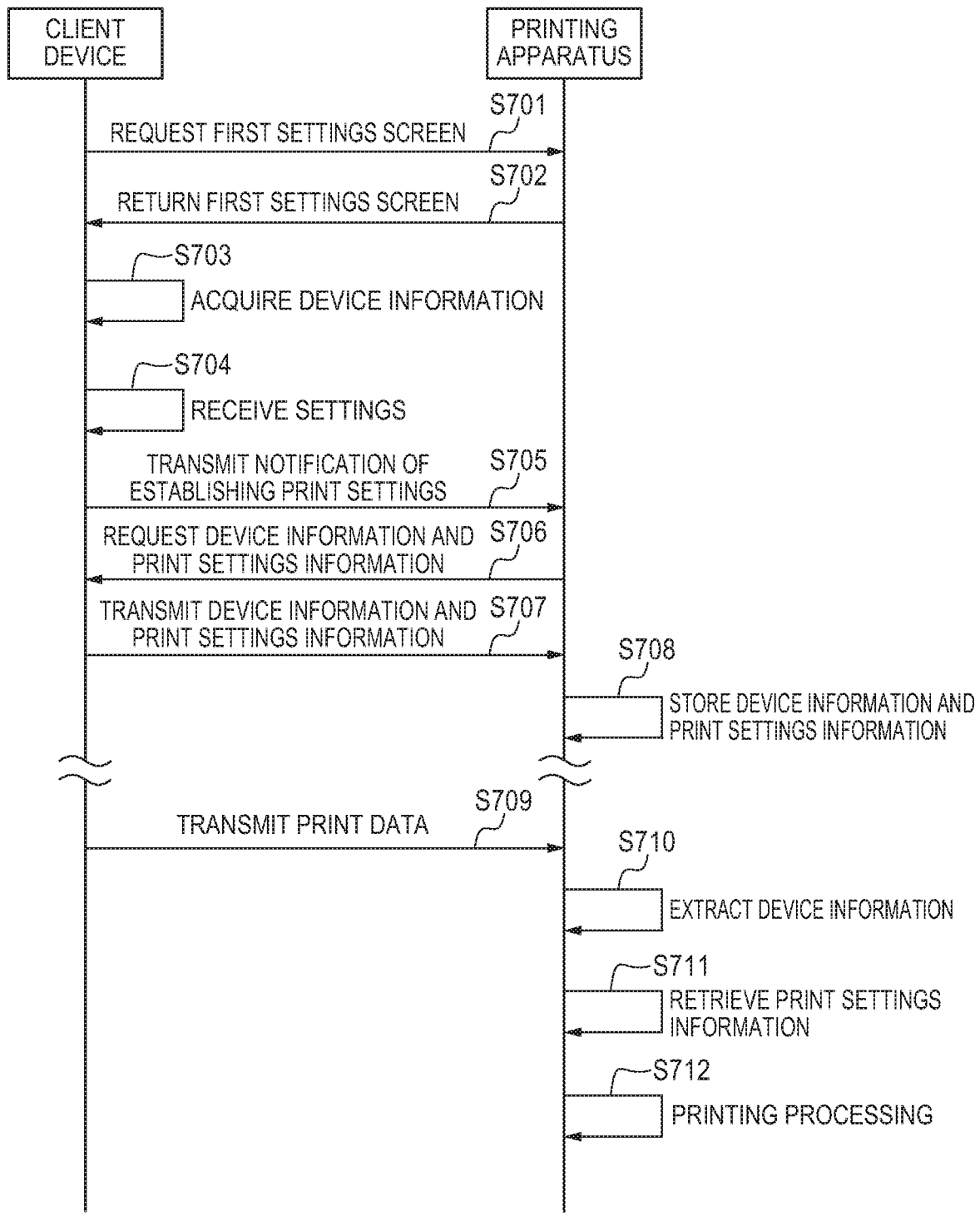
FIG. 7 is a flow chart for illustrating printing processing.

FIG. 7 is a flow chart for illustrating printing processing to be executed by the printing system 100. First, in Step S701, the client device 102 requests the printing apparatus 101 for the first settings screen 500 illustrated in FIG. 5 by using a web browser. Next, in Step S702, the printing apparatus 101 returns to the client device 102 a reply for the request for the first settings screen 500.

Next, in Step S703, the client device 102 runs a JavaScript program, which is embedded in the second settings screen 600 (FIG. 6A and FIG. 6B) to which the received first settings screen 500 transitions, on the web browser, and acquires device information on the own device. Next, in Step S704, the client device 102 receives print settings in accordance with user input in the advanced settings region 601 of the second settings screen 600.

Next, when the finish button 602 of the second settings screen 600 is selected, in Step S705, the client device 102 transmits a notification of establishing the print settings to the printing apparatus 101. Next, in Step S706, the printing apparatus 101 requests the web browser of the client device 102 for device information and print settings information. Next, in Step S707, the web browser of the client device 102 transmits the device information and the print settings information to the printing apparatus 101. As described above, the device information includes an IP address of the client device 102 being a transmission source. The IP address is identification information for identifying the client device or a user of the client device, and is an example of transmission source information.

Next, in Step S708, the printing apparatus 101 stores the device information and the print settings information, which are received in Step S707, into a storage, for example, the auxiliary storage 203, as the setting-time device information in association with each other. The setting-time device information is held until printing processing (Step S712) described later is started. After the setting-time device information is stored, the printing apparatus 101 prohibits reception of advanced print settings on the second settings screen 600. In the client device 102, print setting cannot be performed until the reset button 610 is selected and reception of advanced print settings is allowed.

Next, in Step S709, the client device 102 transmits print data to the printing apparatus 101 by using HTTP and IPP communication protocols. Next, in Step S710, the printing apparatus 101 receives the print data, and extracts and acquires device information that can be acquired by using HTTP and IPP communication protocols as printing-time device information. Next, in Step S711, the printing apparatus 101 retrieves the setting-time device information acquired in Step S708, which is the same as the printing-time device information acquired in Step S710, and extracts the associated print settings information. Next, in Step S712, the printing apparatus 101 uses the print settings information included in the printing-time device information extracted in Step S711 to execute processing of printing the print data received in Step S710.

Figure 8:
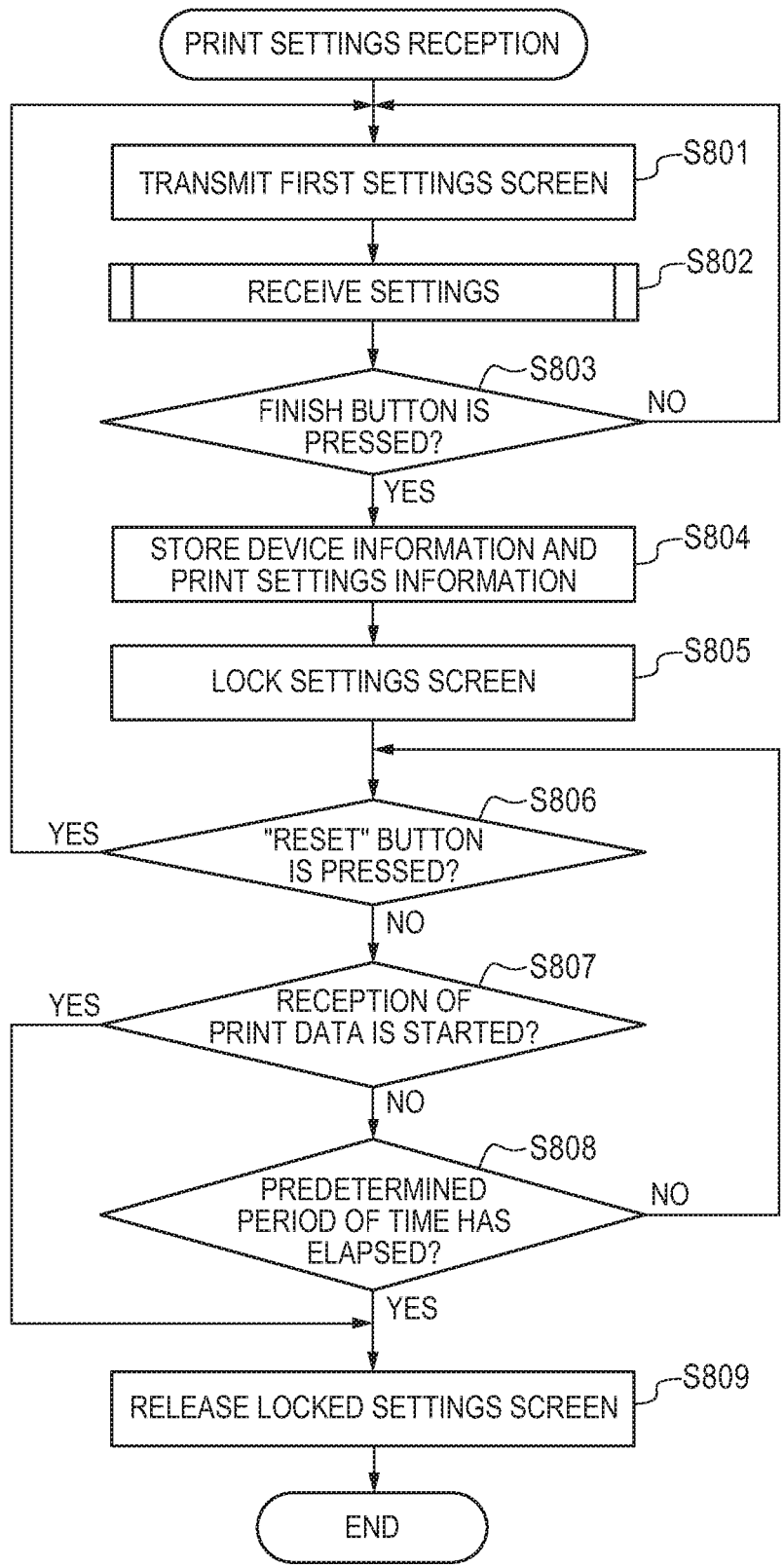
FIG. 8 is a flow chart for illustrating settings reception processing.

FIG. 8 is a flow chart for illustrating settings reception processing to be executed by the printing apparatus 101. The settings reception processing is started when the printing apparatus 101 has received a request for the first settings screen from the client device 102 in Step S701 illustrated in FIG. 7. In Step S801, the communication processor 401 of the printing apparatus 101 transmits the first settings screen to the client device 102 in accordance with the request for the first settings screen, and the client device 102 displays the first settings screen on the web browser. Next, in Step S802, the setting manager 402 receives settings on the first settings screen and the second settings screen via the communication processor 401 in accordance with an operation performed by the user on the client device 102.

Next, in Step S803, the setting manager 402 determines whether the finish button 602 of the second settings screen 600 is pressed in order to determine whether print setting is complete on the second settings screen 600. When the finish button 602 is pressed (YES in Step S803), the setting manager 402 advances the processing to Step S804. When the finish button 602 is not pressed, the setting manager 402 advances the processing to Step S801.

When the finish button 602 is pressed, the client device 102 executes a program embedded in the web browser, and transmits a notification of establishing the print settings to the printing apparatus 101. The system of acquiring the device information on the client device 102 is programmed in the web browser, and this program is read at the time of display on the web browser, to thereby extract the device information.

In Step S804, the setting manager 402 requests the client device 102 for device information and print settings information, and receives the device information and the print settings information from the client device 102. Then, the setting manager 402 stores the device information and the print settings information into the storage as the setting-time device information in association with each other. Next, in Step S805, the setting manager 402 causes the screen display of the client device 102 to transition to a locked screen illustrated in FIG. 6B. That is, the setting manager 402 prohibits the user from changing the settings. After that, the screen continues to be locked until the reset button 610 is selected, a predetermined period of time has elapsed, or print data is received. At this time, the setting manager 402 may further display information to the effect that print data is not received.

Next, in Step S806, the setting manager 402 determines whether the reset button 610 is selected, and a reset instruction is input. When the reset button 610 is selected and a reset instruction is input (YES in Step S806), the setting manager 402 advances the processing to Step S801. In this case, the setting manager 402 displays the first settings screen or the second settings screen again, and receives the settings again. When the reset button 610 is not selected, that is, when a reset instruction is not input (NO in Step S806), the setting manager 402 advances the processing to Step S807.

In Step S807, the setting manager 402 determines whether reception of print data is started. When reception of print data is started (YES in Step S807), the setting manager 402 advances the processing to Step S809. When print data is not received (NO in Step S807), the setting manager 402 advances the processing to Step S808. In Step S808, the setting manager 402 determines whether a predetermined period of time has elapsed since selection of the finish button 602 in Step S803. When a predetermined period of time has elapsed (YES in Step S808), the setting manager 402 advances the processing to Step S809. When a predetermined period of time has not elapsed (NO in Step S808), the setting manager 402 advances the processing to Step S807. In Step S809, the setting manager 402 releases the locked screen. That is, the setting manager 402 displays, on the client device 102, the second settings screen enabling change of the settings as illustrated in FIG. 6A. In this manner, the settings reception processing is finished.

Figure 9:
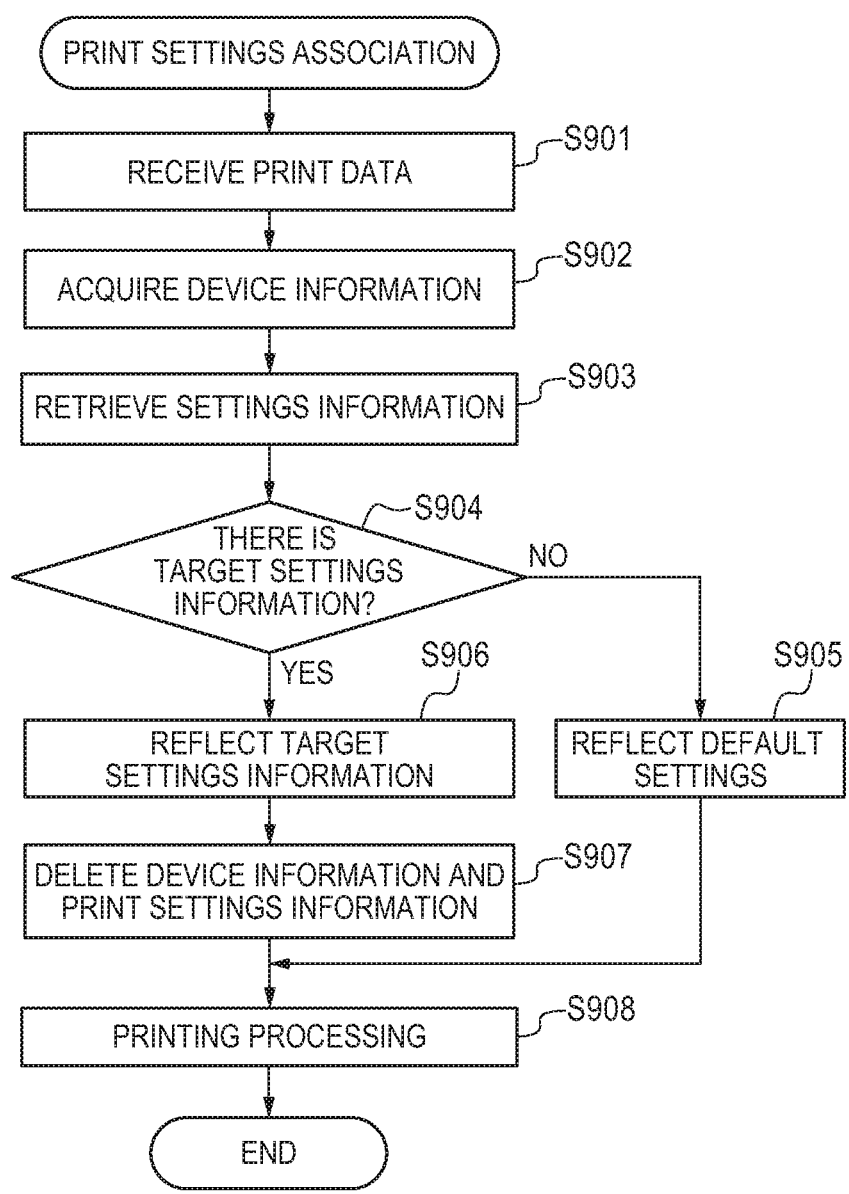
FIG. 9 is a flow chart for illustrating print settings association processing.

FIG. 9 is a flow chart for illustrating print settings association processing to be executed by the printing apparatus 101. This processing is started when reception of print data is started in Step S807. In Step S901, the setting manager 402 receives print data from the client device 102. Next, in Step S902, the setting manager 402 extracts device information that can be acquired by using the communication protocol used at the time of reception of print data, and stores the device information as the printing-time device information in association with the print data.

Next, in Step S903, the setting manager 402 retrieves device information matching the printing-time device information acquired in Step S902 among pieces of setting-time device information stored in Step S804 illustrated in FIG. 8, to thereby retrieve target settings information to be applied to the print data. Specifically, the setting manager 402 identifies, as the target settings information to be applied to the print data, settings information associated with the device information matching the printing-time device information acquired in Step S902. When there is target settings information (YES in Step S904), the setting manager 402 advances the processing to Step S906. When there is no target settings information (NO in Step S904), the setting manager 402 advances the processing to Step S905.

In Step S905, the setting manager 402 reflects default print settings set in advance as the settings to be applied to the print data, and then advances the processing to Step S908. In Step S906, the setting manager 402 reflects, as the settings to be applied to the print data, print settings indicated in the target settings information identified in Step S903. Next, in Step S907, the setting manager 402 deletes the setting-time device information, namely, the device information and the print settings information acquired at the time of completion of print setting that depends on the user operation. Next, in Step S908, the setting manager 402 performs such control as to execute printing in accordance with a set print settings value. In this manner, the print settings association processing is finished.

As described above, the printing system 100 according to the first embodiment can achieve printing processing that can use advanced setting that utilizes the functional characteristics of the printing apparatus 101 even when the standard printing function provided by the OS of the client device 102 is used.

Figure 10A:
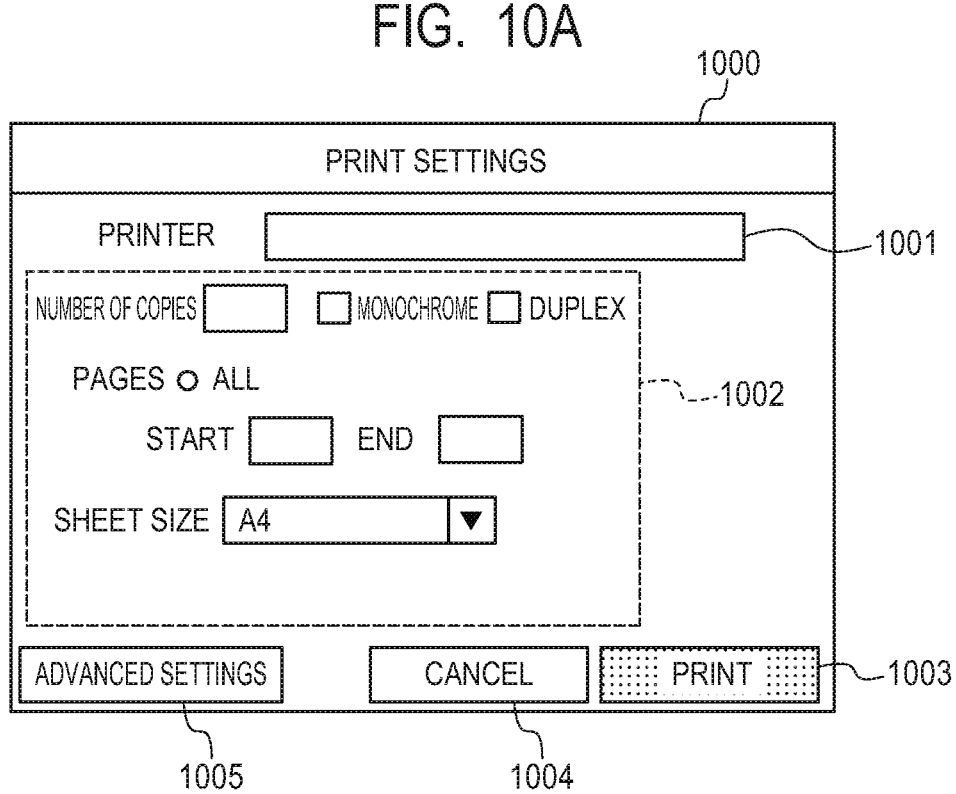
FIG. 10A and FIG. 10B are diagrams for illustrating examples of a UI screen.
Figure 10B:
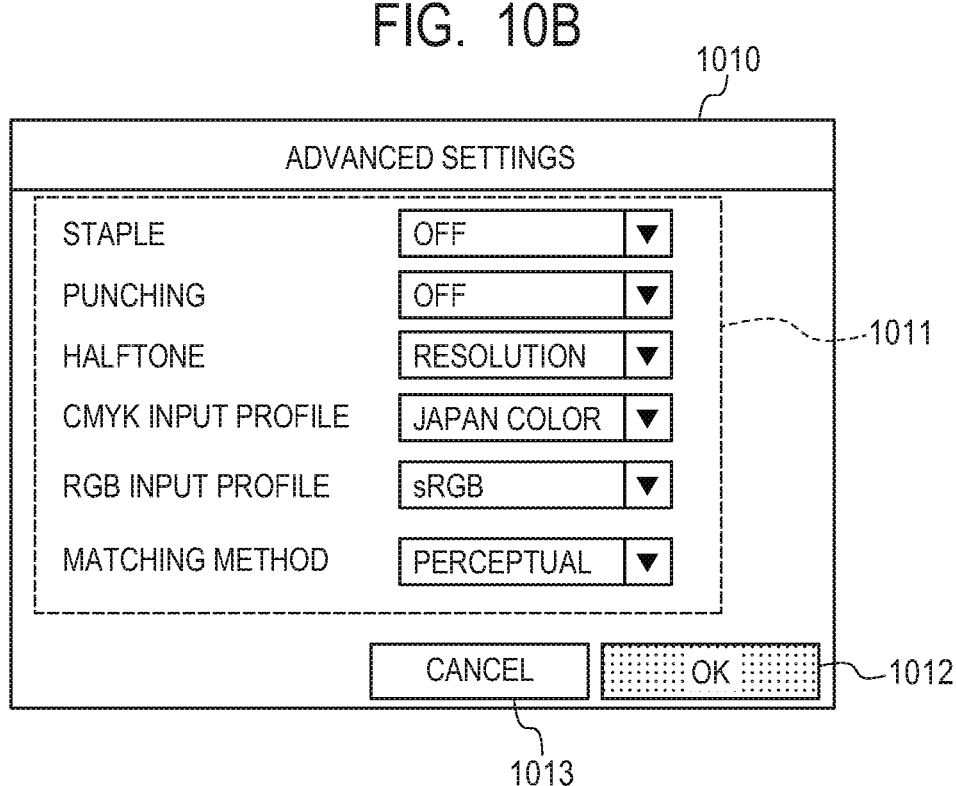

FIG. 10A and FIG. 10B are diagrams for illustrating an example of the U screen of the printer driver of the printing apparatus, which is displayed on the client device. FIG. 10A is a diagram for illustrating a print settings screen 1000 being a main UI screen of the printer driver. An option 1001 of the printer to which print data is to be transmitted and a basic settings region 1002 are provided on the print settings screen 1000. The basic settings region 1002 enables basic print setting such as, the number of copies, color/monochrome printing, duplex printing, the page range, and the sheet size. The print settings screen 1000 further displays a print button 1003, a cancel button 1004, and an advanced setting button 1005. The print button 1003 is a button for transmitting print data and starting printing processing. The cancel button 1004 is a button for canceling a printing instruction. The advanced setting button 1005 is a button for transitioning to a UI screen on which advanced setting that utilizes the functional characteristics of the printing apparatus 101 can be performed.

FIG. 10B is a diagram for illustrating an advanced setting screen 1010 to which the advanced setting button 1005 can be pressed to transition. An advanced settings region 1011 is provided on the advanced setting screen 1010. The user can perform advanced setting that utilizes the functional characteristics of the printing apparatus 101 on the advanced settings region 1011. Further, the advanced setting screen 1010 displays an OK button 1012 for establishing the edited print settings, and a cancel button 1013 for canceling editing of the advanced settings.

Print settings that can be set by the standard printing function provided by the OS mounted in the client device are often basically limited to basic print settings that can be set in the basic settings region 1002 illustrated in FIG. 10A. In view of this, the printer driver of the printing apparatus 101 is installed into the client device, and advanced setting that utilizes the functional characteristics of the printing apparatus 101 is performed on the advanced setting screen 1010 as illustrated in FIG. 10B, which is displayed by the printer driver. However, there is also a use case in which some client devices, for example, a smartphone, cannot install the printer driver, and thus can execute only the basic print setting that can be executed with the standard printing function provided by the OS.

In contrast, as described above, the printing system 100 according to the first embodiment can execute print setting that utilizes the functional characteristics of the printing apparatus also in printing processing that depends on an instruction from the client device that has not installed a printer driver.

Second Embodiment

Next, as a second embodiment of the present disclosure, description is now made of a method of enabling settings without the same user selecting the previous settings again when the user causes printing again through the client device.

As described in the first embodiment, the second settings screens 600 illustrated in FIG. 6A and FIG. 6B are displayed through selection of the preliminary print settings button 503 arranged on the first settings screen 500 illustrated in FIG. 5. The second settings screen 600 displays the advanced settings region 601 enabling advanced setting that utilizes the functional characteristics of the printing apparatus 101.

The advanced settings region 601 is displayed on the web browser by using the technology of JavaScript or WebRTC embedded in the second settings screen 600. When the device information on the client device 102 matches the device information on the previous printing job, a set value stored in the web browser is set as an initial value of items displayed on the advanced settings region 601. In the second embodiment, it is assumed that Web Storage is used as a system for storing information into the web browser. However, the present disclosure is not limited thereto.

Figure 11:
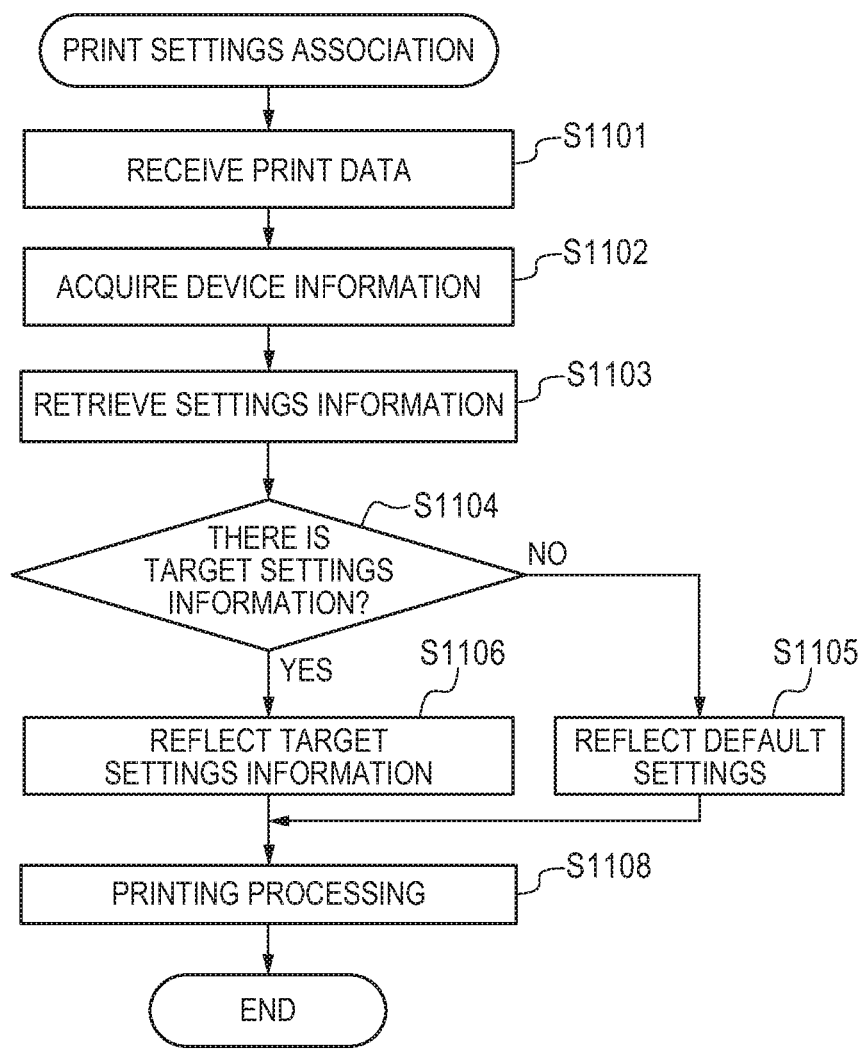
FIG. 11 is a flow chart for illustrating print settings association processing in a second embodiment of the present disclosure.

FIG. 11 is a flow chart obtained by removing, from the flow chart of FIG. 9 for illustrating print settings association processing to be executed by the printing apparatus 101, Step S907 being the device information and print settings information deletion processing. The descriptions of Step S1101 to Step S1108 are operations similar to those of Step S901 to Step S908, and thus description thereof is omitted here. As illustrated in this flow chart, the device information and the print settings information are stored into the printing apparatus 101 also after the printing processing is finished, to thereby be able to refer to the previous print settings information at the time of next print setting.

Figure 12:
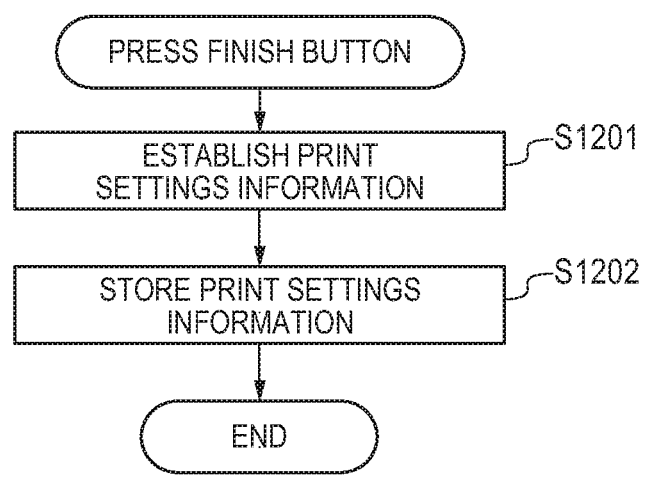
FIG. 12 is a flow chart for illustrating print settings information establishment processing in the second embodiment.

FIG. 12 is a flow chart for illustrating processing of establishing print settings set by the user on the advanced settings region 601 after the finish button 602 displayed on the second settings screen 600 is selected.

In Step S1201, the second settings screen 600 establishes print settings set in the advanced settings region 601. That is, Step S705 in FIG. 7 is executed.

Next, in Step S1202, the second settings screen 600 causes the web browser to store various kinds of settings set in the advanced settings region 601 by using the technology of Web Storage described above and the like. In this manner, the print settings establishing processing is finished.

Figure 13:
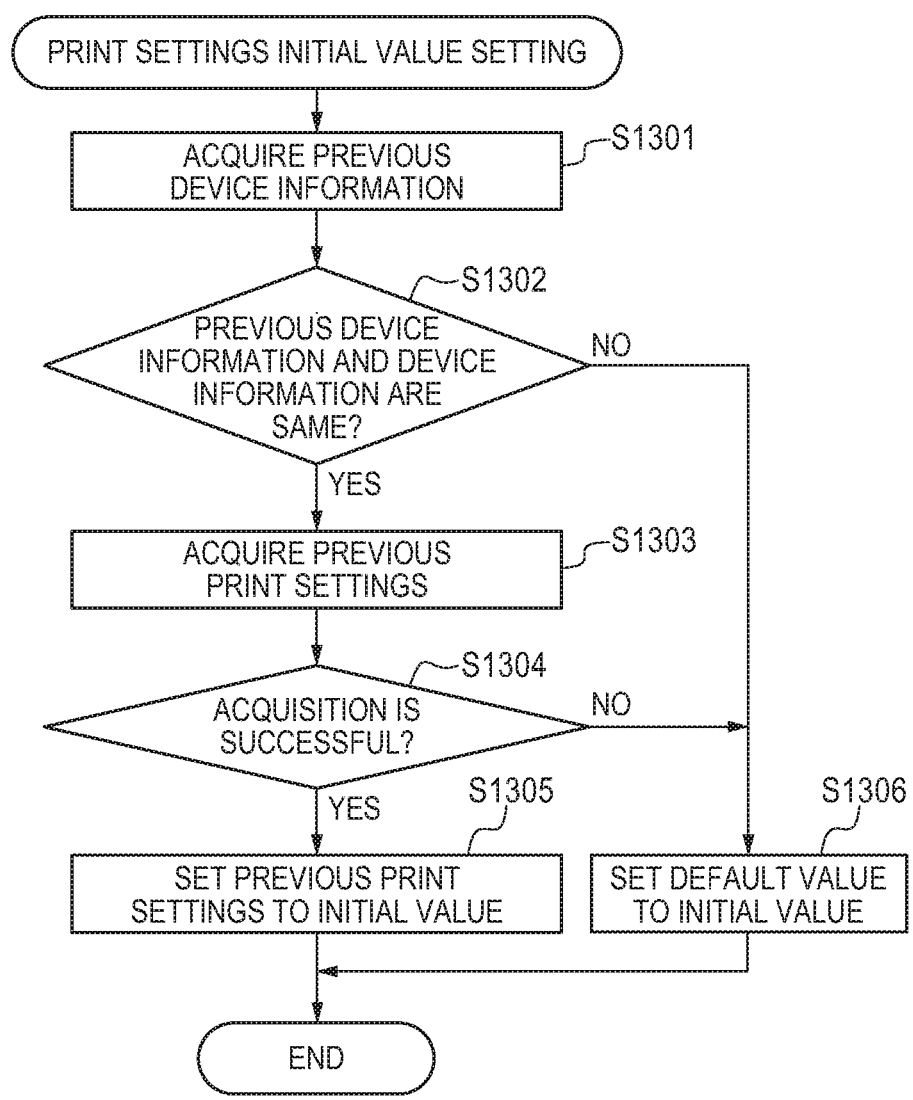
FIG. 13 is a flow chart for illustrating print settings initial value setting processing in the second embodiment.

FIG. 13 is a flow chart for determining an initial value of each setting item in the advanced settings region 601 displayed on the second settings screen 600. This processing is executed to acquire an initial value of each parameter when the advanced settings region 601 is displayed by using the technology of JavaScript or WebRTC on the second settings screen 600 for performing a setting operation by the client device 102.

In Step S1301, the second settings screen 600 acquires device information stored in the printing apparatus 101. As illustrated in the flow chart of FIG. 11, in the second embodiment, the device information is not deleted at the time of printing processing, and thus device information at the time of previous printing can be acquired in Step S1301. Next, in Step S1302, the second settings screen 600 checks whether the device information on the client device 102 and the device information acquired in Step S1301 match each other. When those pieces of device information match each other (YES in Step S1302), the second settings screen 600 advances the processing to Step S1303. When those pieces of device information do not match each other (NO in Step S1302), the second settings screen 600 advances the processing to Step S1306.

Next, in Step S1303, the second settings screen 600 acquires the print settings used at the time of previous printing stored in the second settings screen 600 itself. Next, in Step S1304, the second settings screen 600 determines whether the print settings have been acquired in Step S1303. When the print settings have been acquired (YES in Step S1304), the second settings screen 600 advances the processing to Step S1305, and sets the value acquired in Step S1303 as an initial value of the parameter indicated in the advanced settings region 601. When the print settings have not been acquired (NO in Step S1304), the second settings screen 600 advances the processing to Step S1306.

In Step S1306, the second settings screen 600 sets a default value set in the JavaScript or WebRTC program as an initial value of the parameter indicated in the advanced settings region 601. In this manner, the print settings initial value setting processing is finished.

As described above, the printing system 100 according to the second embodiment of the present disclosure can execute print settings without the same user selecting the previous settings again when the user causes printing again through the client device 102.

As a modification example of the second embodiment, it is possible to employ a configuration of determining whether the client is the same by using user information in place of the device information. In this case, it is possible to set an initial value of an item displayed in the advanced settings region 601 as the value of the print settings information stored in the storage of the printing apparatus 101 in Step S804. In order to apply this modification example, user information is required to be input by, for example, a method of requiring user authentication to display the UI screen. Further, user information settings are required to be added to the print settings stored in the printing apparatus 101. Now, this modification example is described as a third embodiment of the present disclosure.

Third Embodiment

Figure 14:
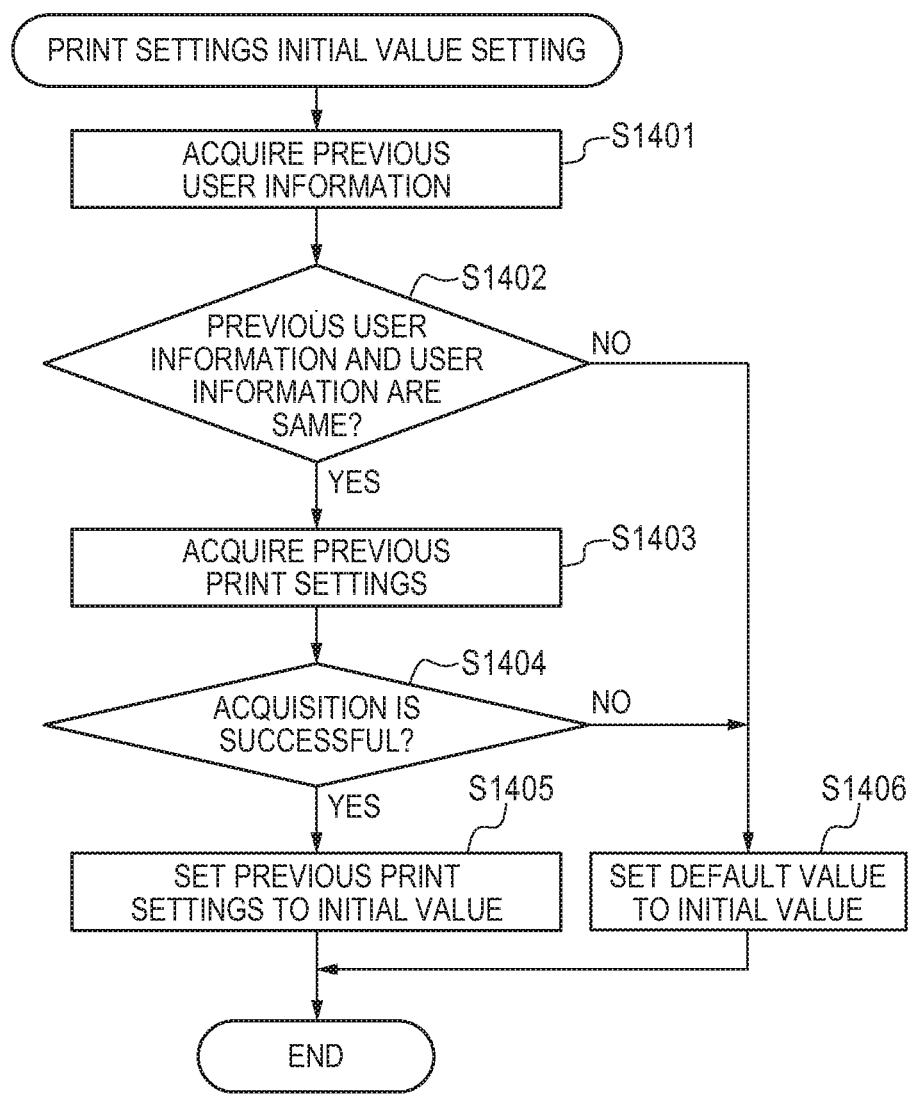
FIG. 14 is a flow chart for illustrating print settings initial value setting processing in the third embodiment of the present disclosure.

FIG. 14 is a flow chart for illustrating processing in the third embodiment. Regarding description of this flow chart, only the difference from FIG. 13 is described. In Step S1401, the second settings screen 600 acquires the user information stored in the printing apparatus 101. Next, in Step S1402, the second settings screen 600 checks whether the current user information and the user information acquired in Step S1401 match each other. When those pieces of user information match each other (YES in Step S1402), the second settings screen 600 advances the processing to Step S1403. When those pieces of user information do not match each other (NO in Step S1402), the second settings screen 600 advances the processing to Step S1406. In the processing of Step S1403, the second settings screen 600 acquires the previously used print settings stored in the storage of the setting manager 402.

With the above-mentioned configuration, the printing system 100 according to the third embodiment of the present disclosure can execute the print settings stored in the setting manager 402 of the printing apparatus 101 without the same user selecting the previous settings again when the user causes printing again.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-091658, filed May 14, 2019, which is hereby incorporated by reference herein in its entirety.

What is claimed is:

1. A printing apparatus comprising:
   a controller including a processor, the controller configured to:
   transmit, to an information processing device, information about a print settings screen of the printing apparatus, wherein the information is to be used for the information processing device to display the print settings screen;
   store print settings, which are input on the displayed print settings screen, into a memory in association with information about the information processing device;
   transmit, to the information processing device, information indicating that print data is not received, wherein the information that indicates that print data is not received is to be used for the information processing device to display the information; and
   execute printing processing based on the print settings when print data is received from the information processing device, wherein the print settings are stored in the memory in association with the information about the information processing device that has transmitted the print data.

2. The printing apparatus according to claim 1, wherein the information about the information processing device indicates transmission source of the print settings that are input on the displayed print settings screen.

3. The printing apparatus according to claim 2, wherein the information about the information processing device is a global IP address or a local IP address of the information processing device.

4. The printing apparatus according to claim 2, wherein the controller is further configured to store the print settings in association with a user identification information that is corresponding to a user who operates the information processing apparatus.

5. The printing apparatus according to claim 1, wherein the transmitted information indicating that print data is not received is displayed during a period of time from storing the print settings to reception of the print data.

6. The printing apparatus according to claim 1, wherein the controller is further configured to prohibit reception of change of the print settings during a period of time from storing the print settings to reception of the print data.

7. The printing apparatus according to claim 6, wherein the controller is further configured to perform such control as to allow reception of the print settings when the print data is received.

8. The printing apparatus according to claim 6, wherein the controller is further configured to allow the information processing device to receive change of the print settings when the print settings is stored and then a reset instruction is input in the information processing device.

9. The printing apparatus according to claim 6, wherein the controller is further configured to allow storing new print settings when a predetermined period of time has elapsed since storing the print settings.

10. The printing apparatus according to claim 1, wherein the controller is further configured to execute the printing processing based on default settings determined in advance when the print data is received from the information processing device under a state in which the controller has not stored the print settings.

11. The printing apparatus according to claim 1, wherein the controller is further configured to receive the print settings from the information processing device via a JavaScript framework or a Web Real-Time Communication framework.

12. The printing apparatus according to claim 1, wherein the controller is further configured to:
    receive, from the information processing device, a request for displaying the print settings screen; and
    transmit, to the information processing device, the information about the print settings screen of the printing apparatus, wherein the information is to be used for the information processing device to display the print settings screen.

13. The printing apparatus according to claim 1, wherein the controller is further configured to receive the print data with the information of the information processing device that is transmission source of the print data.

14. The printing apparatus according to claim 13, wherein the controller is further configured to:
    select the stored print settings that are stored in association with the information received with the print data; and
    execute printing processing based on the print settings based on the selected print settings.

15. A printing control method, which is executed by a printing apparatus, comprising:
    transmitting, to an information processing device, information about a print settings screen of the printing apparatus, wherein the information is to be used for the information processing device to display the print settings screen;
    storing print settings, which are input on the displayed print settings screen, into a memory in association with information about the information processing device;
    transmitting, to the information processing device, information indicating that print data is not received, wherein the information that indicates that print data is not received is to be used for the information processing device to display the information; and
    executing printing processing based on the print settings when print data is received from the information processing device, wherein the print settings are stored in the memory in association with the information about the information processing device that has transmitted the print data.

16. A non-transitory computer-readable storage medium having stored thereon a program including executable instructions, which when executed by one or more processors of a printing apparatus, cause the printing apparatus to perform operations comprising:
- transmitting, to an information processing device, information about a print settings screen of the printing apparatus, wherein the information is to be used for the information processing device to display the print settings screen;
- storing print settings, which are input on the displayed print settings screen, into a memory in association with information about the information processing device;
- transmitting, to the information processing device, information indicating that print data is not received, wherein the information that indicates that print data is not received is to be used for the information processing device to display the information; and
- executing printing processing based on the print settings when print data is received from the information processing device, wherein the print settings are stored in the memory in association with the information about the information processing device that has transmitted the print data.

* * * * *